Nov. 23, 1943.  F. W. LAUCK  2,335,153
GLASS LINED HEAD FOR TANKS
Filed April 25, 1942
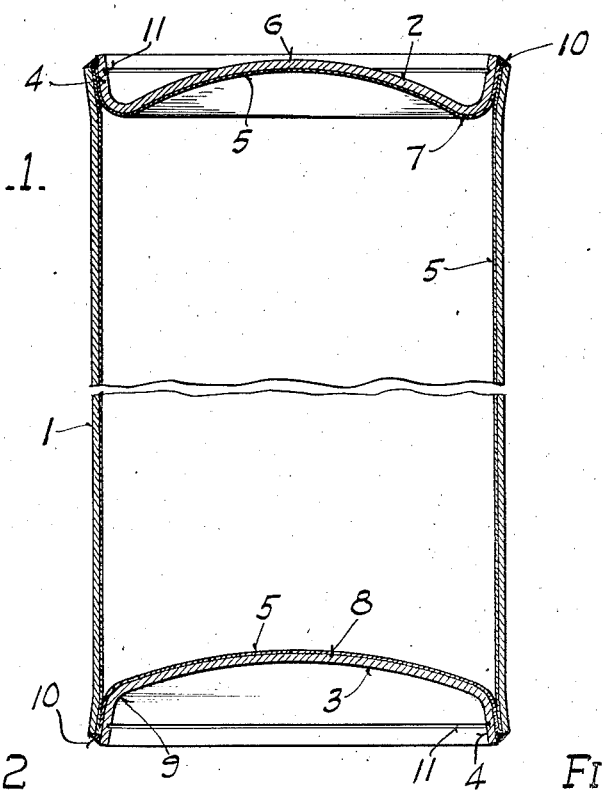
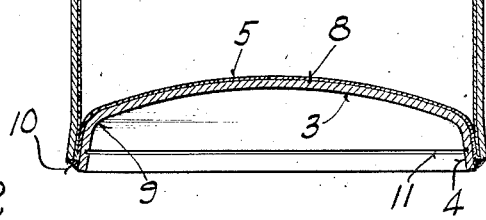
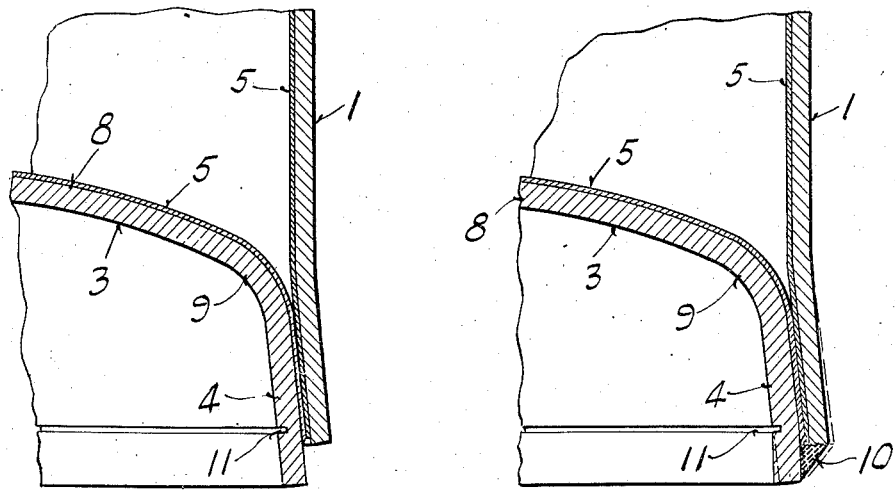
Francis W. Lauck
INVENTOR:
BY
ATTORNEY.

Patented Nov. 23, 1943

2,335,153

UNITED STATES PATENT OFFICE 2,335,153

GLASS-LINED HEAD FOR TANKS

Francis W. Lauck, Milwaukee, Wis., assignor to A. O. Smith Corporation, Milwaukee, Wis., a corporation of New York Application April 25, 1942, Serial No. 440,426

3 Claims. (Cl. 220—64)

This invention relates to glass lined heads for tanks and has found practical application in the construction of domestic hot water storage tanks having ceramic enamel linings.

In the construction of such tanks it is the better practice to line the heads and shell separately before assembling and welding, as set forth in the Letters Patent No. 2,263,021 granted to Otto Uecker on November 18, 1941. In such construction the heads have an outwardly extending flange joined to the central pressure retaining portion of the head by a curved knuckle portion of substantial radius. The outer end of the flange is welded to the end edge of the shell to complete the closure.

The shrinkage of the weld in cooling down has a tendency to reduce the radius of the outer end of the flange and to thereby tend to reduce the knuckle radius of the head. This tendency results in a prestressed condition in the knuckle of the head, which, when the working stress from internal fluid pressure is added and the head is sufficiently thin, may result in a movement in the head that crazes or injures the enamel lining of the head.

The principal object of the invention is to eliminate the stress caused heretofore by shrinkage of the weld so that there is less danger of injury to the enamel under working loads.

Another object is to utilize the shrinkage of the weld to more tightly seal the overlapping contacting surfaces of the shell and the head flange which constitute the approach to the weld for the liquid contents of the tank.

Another object is to control and localize the stresses resulting from shrinkage of the weld at points remote from stresses resulting from working pressures in the tank.

Another object is to provide for the safe employment of thinner metal walls for the heads of the tank.

Other objects will appear hereinafter in connection with the description of the preferred embodiment of the invention illustrated in the accompanying drawing.

In the drawing:

Figure 1 is a vertical central longitudinal section through a domestic hot water tank with parts broken away;

Fig. 2 is an enlarged sectional view showing one side of the head and shell assembled ready for welding; and Fig. 3 is a similar sectional view showing the parts after welding with the movement caused by weld shrinkage exaggerated for illustrative purposes.

The tank comprises a cylindrical shell 1 and upper and lower heads 2 and 3 having reverse flanges 4 inserted in the ends of the shell and welded thereto at the adjacent outer ends of the flanges and shell. A ceramic enamel lining 5 is applied and fired to the inner surface of the heads and shell prior to assembly. The lining on the outer surfaces of the circumferential flanges of the heads overlaps the lining of the shell for a substantial distance either with or without a packing material therebetween.

The heads 2 and 3 are formed from flat sheets of metal. The upper head 2 preferably has an upward or outward crown 6 which is joined to its circumferential flange 4 by a curved knuckle 7 constituting a reverse bend. The lower head 3 preferably has an upward or inward crown 8 joined to its circumferential flange 4 by an ordinary curved knuckle 9.

The heads 2 and 3 are joined to the respective end edges of the shell by circumferential arc welds 10.

In order to prevent stresses from building up in the knuckles 7 and 9 by reason of the shrinkage of the welds, each of the flanges 4 is provided with a circumferential slot 11 preferably on the exposed side of the flange opposite the weld 10. The slots 11 should extend a sufficient distance through the thickness of the flanges 4 to provide a line of bending weakness where the shrinkage of the weld can bend the outer ends of the flanges inwardly as shown in Fig. 3 without bending the main body of the flanges or stressing the knuckles of the heads. The slots 11 should be located near the weld and between it and the main body of the head. The slots may be located on the enameled side of the flanges, if desired.

The shrinkage of the weld 10, as it bends the end of the flange 4 inwardly, draws the end of the shell inwardly to make a tighter contact between it and that part of the head flange between the slot 11 and the head knuckle, as illustrated by comparing Figs. 2 and 3. This more adequately seals the approach to the weld metal from the inside and prevents the liquid contents of the tank from circulating in contact with the weld and corroding the same.

The invention makes it possible to employ thinner plate stock for the heads of the tank than would otherwise be possible without danger of injury to the enamel from stress at the knuckle of the head in service.

Various embodiments of the invention may be employed within the scope of the accompanying claims.

The invention is claimed as follows:

1. A tank of the class described, comprising a curved pressure-resisting head having a longitudinally extending circumferential flange with a protective lining of brittle material bonded thereto, a generally cylindrical shell having said head inserted in the end thereof with the head flange extending outwardly in overlapping relationship to the end portion of the shell, a circumferential weld joining the outer end of the head flange to the end of the shell, and a predetermined circumferential line of reduced thickness in said head flange between the weld and the juncture of the flange with the main body of the head to relieve the latter of stresses resulting from shrinkage of the weld.

2. In a tank of the class described having a lined circumferentially flanged head inserted in and circumferentially welded to the end of a generally cylindrical shell, a circumferential slot disposed in the flange between the weld and the juncture of the flange with the body of the head to relieve the latter of stresses set up by shrinkage of the weld.

3. In a tank of the class described, a ceramic enamel lined head with a longitudinally extending circumferential flange inserted in the end of a generally cylindrical shell, a circumferential weld securing the end of the flange to the end of the shell, and a circumferential slot cut in the flange on the exposed side opposite the lining at a location closely adjacent the weld and between it and the main body of the flange.

FRANCIS W. LAUCK.